United States Patent [19]

Jacobson

[11] Patent Number: 5,248,557
[45] Date of Patent: Sep. 28, 1993

[54] COATED REFRACTORY COMPOSITION AND METHOD FOR MAKING THE SAME

[75] Inventor: Howard W. Jacobson, Wilmington, Del.

[73] Assignee: E. I. du Pont de Nemours and Company, Wilmington, Del.

[21] Appl. No.: 623,582

[22] Filed: Dec. 7, 1990

[51] Int. Cl.⁵ .................................................. B32B 9/00
[52] U.S. Cl. .................................. 428/404; 428/220; 428/323; 428/325; 428/329; 428/402; 428/403; 428/699; 428/702; 501/123; 501/125
[58] Field of Search ............... 428/404, 406, 688, 689, 428/699, 702, 220, 323, 325, 328, 329, 330, 402, 403; 501/123, 125; 427/215, 217

[56] References Cited

U.S. PATENT DOCUMENTS

| | | | |
|---|---|---|---|
| 3,247,014 | 5/1966 | Goldberger | 428/404 |
| 3,607,343 | 9/1971 | Longo et al. | 428/403 |
| 3,656,921 | 4/1972 | Willcox | 428/403 |
| 3,793,055 | 2/1974 | Shodai et al. | 106/629 |
| 3,885,978 | 5/1975 | Doi et al. | 106/690 |
| 3,925,575 | 12/1975 | Church et al. | 427/243 |
| 3,946,134 | 3/1976 | Sherman | 428/404 |
| 3,989,872 | 11/1976 | Ball | 428/404 |
| 4,110,492 | 8/1978 | Hayman | 428/403 |
| 4,126,474 | 11/1978 | Talley et al. | 501/125 |
| 4,144,074 | 3/1979 | Itoh et al. | 106/14.17 |
| 4,357,382 | 11/1982 | Lambert et al. | 428/220 |
| 4,375,496 | 3/1983 | Nowakowski et al. | 428/701 |
| 4,657,784 | 4/1987 | Olson | 428/403 |
| 4,975,314 | 12/1990 | Yano et al. | 428/325 |

OTHER PUBLICATIONS

"Advanced Inorganic Chemistry", Cotton et al., Wiley & Sons, 4th ed., 1980, p. 474.

Primary Examiner—Henry F. Epstein
Assistant Examiner—Archene Turner

[57] ABSTRACT

A composition comprising an alpha alumina substrate having a first coating layer of calcium pyrophosphate and a second coating layer of hydrous alumina, and to a calcined composition comprising an alpha alumina substrate having a first coating layer of calcium pyrophosphate and a second coating layer of a densified anhydrous, crystalline form of alumina and to a method for preparing the same.

9 Claims, 2 Drawing Sheets

COATED REFRACTORY COMPOSITION AND METHOD FOR MAKING THE SAME

BACKGROUND OF THE INVENTION

The present invention relates to a composition comprising a refractory substrate having a first coating layer of a calcium component and a second coating layer of an alumina component, and, more particularly, to a method for improving the strength of a ceramic composite by preparing an alpha alumina substrate having deposited thereon a first coating of calcium pyrophosphate and a second coating of hydrous alumina. Whereupon calcining said composition, said second coating converts to an anhydrous crystalline form of alumina.

Ceramic composites start with a ceramic preform which is usually based on silicon carbide, silicon nitride, aluminum silicate, aluminum oxide or mixtures thereof. These preforms are imbedded in a ceramic matrix to form composites.

Ceramic composites have been found to lose their strength at higher temperatures; a problem which has not yet been resolved. All the useful properties begin in the early stages of ceramic processing. The structural integrity of each material must be preserved through a variety of thermal and mechanical stress exposures. Thus, the need for a high-temperature, high-strength material exists.

The unique properties of the present invention enable the composition to be used as a preform for a ceramic matrix composite having unexpected strength and toughness. These unexpected results are attributed to the coating that provides a debonding function between the preform and the matrix which results in limiting crack propagation in the composite body.

SUMMARY OF THE INVENTION

The invention is directed to a composition comprising a refractory substrate having deposited thereon a first coating layer of a calcium component and a second coating layer of an alumina component. The invention is further directed to a calcined composition wherein said first and second coating form a unique material, a portion of which is anhydrous crystalline alumina.

Another aspect of the present invention is directed to a method for improving the strength and toughness of a ceramic composite according to the steps of:
(a) preparing an aqueous admixture of a refractory substrate, a calcium component precursor and an aluminum salt; and
(b) recovering, washing and drying the coated refractory composition.

A further calcining step forms an anhydrous crystalline alumina coated refractory composition.

DETAILED DESCRIPTION OF THE INVENTION

Figure 1:
FIG. 1 is a transmission electron micrograph of a coated refractory composition prepared by the process of this invention.

The composition of the present invention is a refractory substrate having deposited thereon a first coating layer of a calcium component and a second coating layer of an alumina component. The refractory substrate can be a high temperature crystalline form of alumina such as alpha alumina. Other refractory substrates such as the oxides, carbides, borides, and nitrides, of aluminum, titanium, zirconium or silicon, are also suitable substrates provided that the surface of the these substrates are first covered with a coating of alumina. The substrate is a finely divided powder having an average particle size which can vary over a wide range, i.e., 0.1 to 2500 microns depending upon the shape of the particles. The particle shape can also vary, i.e., the particle shape can be equiaxial, acicular and platelet. When the particles are of alpha alumina, calcium or sodium beta alumina may be present in the refractory substrate. In addition, the refractory substrate should not be soluble in water, dilute acid or base. The surface area of the particles ranges from 0.02 to 20 $m^2/g$. Best results are achieved when the particles have a surface area of from 0.1 to 20 $m^2/g$.

The first coating comprises a calcium component, e.g., an amorphous refractory calcium compound such as calcium pyrophosphate, calcium phosphate, calcium silicate and calcium aluminate. The second outermost coating is an alumina component, e.g., hydrous alumina which can be amorphous, boehmite or mixtures thereof. The first and second coatings can amount to between 0.5 to 25 wt% and are typically 8 to 12 wt% of the total composition. The ratio of the first coating to the second coating is in the range of 0.01 to 0.95 on a weight basis.

Another aspect of the invention is the process for preparing the same. The first step in carrying out the invention is preparation of an aqueous admixture of a refractory substrate, a calcium component precursor and a soluble aluminum salt. In practicing the invention, an aqueous suspension of a refractory substrate is prepared. Commercially available alpha alumina platelets can be used as the substrate and are preferred in terms of cost, convenience and operability. The concentration of particles in the aqueous suspension is not especially critical and can range from 100 to 1000 grams per liter of water. The aqueous substrate suspension is heated to a temperature in the range of from 40° to 95° C. and the pH is adjusted in the range of from 5 to 9. Typically, the pH is within this range; if, however, the pH is less than 5 or more than 9, a few drops of dilute base or dilute acid, respectively, will bring the pH into the desired range.

Next, aqueous solutions of a calcium salt and the desired alkali metal pyrophosphate, phosphate, silicate, aluminate or mixtures thereof are prepared. The sodium salts are preferred and the concentration can range from 50 to 200 grams/liter. For example, sodium pyrophosphate crystals are suitable as a source of phosphate. If sodium silicate is selected as the soluble metal silicate, a clear aqueous solution having a $SiO_2/Na_2O$ molar ratio of 3.24/1 can be used. In the case of sodium aluminate, an aqueous solution containing the equivalent of 5 to 40 wt% $Al_2O_3$ may be used. Also, an aqueous solution of the desired concentration of a soluble calcium salt such as calcium chloride, calcium nitrate or mixtures thereof is prepared. With stirring, the desired alkali metal phosphate, silicate or aluminate solution and a solution of calcium salt are added concurrently to the aqueous suspension at about the same rate while maintaining the temperature in the same range. The pH is kept between 5 and 9 by the controlled addition of HCl (10 to 20%). The process is carried out slowly, i.e., over a period of from 1 to 3 hours. After the addition is complete, stirring is continued and the same temperature range and pH are maintained for 5 to 60 minutes. Under these conditions, the substrate is coated with a layer of, for example, amorphous calcium pyrophosphate, calcium phosphate, calcium silicate or calcium aluminate or mixtures thereof depending upon the alkali metal salt selected.

Then an aqueous solution of an aluminum salt is prepared. Either an acidic or basic water soluble aluminum salt can be used as a source of aluminum oxide, e.g., alkali metal aluminate, ammonium aluminate, aluminum chloride, aluminum nitrate, aluminum acetate and mixtures thereof. The solution used contains aluminum equivalent to 5 to 40 wt% $Al_2O_3$. When acidic aluminum salts are used, alkali is added concurrently and the pH is maintained in the range of 5 to 9 during the coating process. In the case of aluminates, acid is added simultaneously while maintaining the pH in the range of 5 to 9 throughout the process. The preferred source of $Al_2O_3$ is sodium or potassium aluminate and mineral acid is added, typically HCl.

The hydrated aluminum oxide is generated in the presence of the suspended first coated substrate at a carefully controlled rate so that all the hydrated aluminum oxide produced coats the first coated substrate rather than forming as a precipitate. The aqueous suspension of particles coated with the desired calcium component is maintained at temperature in the range of from 50° to 95° C. and a pH in the range of from 5 and 9. To the stirred suspension, the aluminum salt solution is added dropwise and the pH is maintained between 5 and 9. The thickness of the hydrous alumina coating layer is a function of the concentration of the aluminum salt solution, the temperature, mixture pH and time. At a temperature of from 60° to 90° C. and a mixture pH in the range of 7.5 to 9, the hydrous alumina will ordinarily be deposited on the surface of the suspended refractory particles at the rate of 2 to 3 wt%/hour. When the addition is complete, the suspension is stirred for an additional 5 to 60 minutes while maintaining the same range of temperature and pH. This curing step stabilizes the coating layer of hydrated alumina, which is a mixture of amorphous and boehmite alumina on the slurried particles.

The coated particles are then isolated by filtration or centrifugation, washed with water, until free from soluble ions, particularly sodium and chloride ions, and dried by heating at 100° to 300° C.

The particulate composition is a refractory substrate having a composite coating of an amorphous calcium compound and hydrous alumina which can be calcined by heating to 400° to 1100° C. for at least one hour. The coating is densified, and the alumina forms a predominately anhydrous crystalline alumina.

The following procedures are used to characterize the compositions of the above described process. Specific surface area is measured by the BET nitrogen adsorption method. Elemental analysis is performed by EDAX. X-ray diffraction is used to identify the crystalline phases present.

Figure 2:
FIG. 2 is a transmission electron micrograph of a calcined coated refractory composition prepared by the process of this invention.

Referring now to the drawings, FIG. 1 is a transmission electron micrograph of a coated refractory composition obtained by the process of this invention. From this micrograph, the coating layers on the substrate is apparent. This composition is the product of Example 1. FIG. 2 is a transmission electron micrograph of a calcined coated refractory composition prepared by the process of present invention. The coating layers have densified and the hydrous formed alumina portion has been converted to an anhydrous crystalline alumina coating. This composition was prepared according to process steps of Example 1 followed by calcination.

The composition of this inventions and the method of preparation are illustrated in more detail in the following examples, but are not intended to limit the scope of the invention. The products from each of the examples was subsequently calcined at a temperature in the range of from 400° to 1100° C. for at least 1 hour.

EXAMPLE 1

This example describes the preparation of a powder comprising platelets of alpha alumina having a composite coating of calcium pyrophosphate and hydrous alumina.

150 g sodium pyrophosphate crystals ($Na_4P_2O_7.10H_2O$) was dissolved in a liter of water to give a 0.336 M solution. 150 g anhydrous calcium chloride ($CaCl_2$) was dissolved in a liter of water to give a 1.35 M solution.

1000 g alumina powder, having a surface area of 1.4 $m^2/g$ (Microgrit Corp. grade WCA #3), was added to 3 liters of water with good agitation in a 4-liter beaker. The stirred aqueous suspension of alumina powder was heated to 75° C. and the pH was adjusted to 8.0 with a few drops of 6N NaOH. 297 ml of the 0.336 M solution of $Na_4P_2O_7.10H_2O$ and 148 ml of the 1.35 M solution of $CaCl_2$ were added concurrently over a two hour period and the pH was maintained at 8.0 by addition of 20% HCl. The suspension was cured by stirring at pH 8.0 and a temperature of 75° C. for an additional 30 minutes. An aqueous solution of sodium aluminate, [$NaAl(OH)_4$, equivalent 0.385 g $Al_2O_3$/cc; Vinings VSA #38 supplied by Vinings Corp.], was added dropwise to the suspension and the pH was maintained at 8.5 by the controlled addition of 20% HCl. After adding 130 ml of the $NaAl(OH)_4$ solution over a period of two hours the suspension was cured by stirring at pH 8.5 and 75° C. for an additional 30 minutes. All the $Ca_2P_2O_7$ and $Al_2O_3$ were precipitated onto the core alumina, corresponding to 1.59 wt% $Ca_2P_2O_7$ and 4.69 wt% $Al_2O_3$, based on the product. The $Ca_2P_2O_7/Al_2O_3$ ratio was 0.339.

The solids were recovered by filtering the suspension and washed with deionized water until free from sodium and chloride ions. The solids were dried overnight in an air oven at 120° C.

Determination of the elements, other than oxygen by EDAX analysis of the product gave Al 96.383, Ca 1.684 and P 1.933 on a wt% basis.

The surface area was 23.6 $m^2/g$.

EXAMPLE 2

This example describes the preparation of a powder comprising platelets of alpha alumina having a composite coating of calcium silicate and hydrous alumina.

1000 g alumina powder, (alpha alumina platelets from Du Pont) having a surface area of 0.4 $m^2/g$, was added to 2 liters of water with good agitation in a 4-liter beaker. The stirred aqueous suspension of $Al_2O_3$ was heated to 80° C. and the pH was adjusted to 9.0 with a few drops of 6N NaOH. 48 g of potassium silicate solution ($K_2SiO_3$ containing 0.25 g $SiO_2$ per gram of solution) and 148 ml of a 1.35 M hour period maintaining the pH at 9.0 by addition of 20% HCl. The suspension was cured by stirring at pH 9.0 and a temperature of 80° C. for an additional 30 minutes. An aqueous solution of sodium aluminate, [NaAl(OH)$_4$, equivalent 0.385 g Al$_2$O$_3$/cc; Vinings VSA #38 supplied by Vinings Corp.], was added dropwise to the suspension and the pH was maintained at 8.0 by the controlled addition of 20% HCl. After adding 130 ml of the NaAl(OH)$_4$ solution over a period of two hours the suspension was cured by stirring at pH 8.0 and a temperature of 80° C. for an additional 30 minutes. All the CaSiO$_3$ and Al$_2$O$_3$ were precipitated onto the core alumina corresponding to 0.726 wt% CaSiO$_3$ and 4.69 wt% Al$_2$O$_3$, based on the product. The CaSiO$_3$/Al$_2$O$_3$ ratio was 0.155.

The solids were recovered by filtering the suspension and washed with deionized water until free from potassium and chloride ions. The solids were dried by heating in an air oven at 120° C. for 12 hours.

The surface area of the dried product was 17.3 m$^2$/g.

The dried product was calcined at 1000° C. for one hour to give a powder having a surface area of 8.4 m$^2$/g.

EXAMPLE 3

This example describes the preparation of a powder comprising alumina platelets having a composite coating amounting to three times as much as that described in EXAMPLE 1. The calcium pyrophosphate and alumina are in the same ratio.

100 g sodium pyrophosphate crystals was dissolved in a liter of water to give a 0.224 M solution. 150 g anhydrous calcium chloride was dissolved in a liter of water to give a 1.35 M solution.

200 g alumina powder, (alpha alumina platelets similar to Example 1) was added to 1 liter of water with good agitation in a 2-liter beaker. The stirred aqueous suspension of the alumina platelets was heated to 75° C. and the pH was adjusted to 8.0 with a few drops of 6N NaOH. 267 ml of the 0.224 M solution of Na$_4$P$_2$O$_7$.10H$_2$O and 88.8 ml of the 1.35 M solution of CaCl$_2$ were added concurrently over a two hour period and the pH was maintained at 8.0 by addition of 20% HCl. The suspension was cured by stirring at pH 8.0 and a temperature of 75° C. for an additional 30 minutes. An aqueous solution of sodium aluminate, [NaAl(OH))$_4$ equivalent of 0.385 g Al$_2$O$_3$/cc; Vinings VSA #38 supplied by Vinings Corp.] was added dropwise to the suspension and the pH was maintained at 8.5 by the controlled addition of 20% HCl. After adding 78 ml of the NaAl(OH)$_4$ solution over a period of two hours the suspension was cured by stirring at pH 8.5 and a temperature of 75° C. for an additional 30 minutes. All the Ca$_2$P$_2$O$_7$ and Al$_2$O$_3$ were precipitated onto the core alumina, corresponding to 4.77 wt% Ca$_2$P$_2$O$_7$ and 14.07 wt% Al$_2$O$_3$ based on the product. The Ca$_2$P$_2$O$_7$/Al$_2$O$_3$ ratio was 0.339.

The solids were recovered by filtering the suspension and washed with deionized water until free from sodium and chloride ions. The solids were dried overnight in an air oven at 120° C. The weight of dry solids recovered was 239.5 g, corresponding to a yield of 97.2%.

The surface area of the product was 57.2 m$^2$/g.

EXAMPLE 4

This example describes the preparation of a powder comprising alumina platelets having a composite coating amounting to four times as much alumina and one quarter as much calcium pyrophosphate as that described in EXAMPLE 1.

The solutions used and the procedure were the same as those described in EXAMPLE 3, the amounts being changed to 22.0 ml of sodium pyrophosphate, 7.4 ml of calcium chloride and 104.0 ml of sodium aluminate.

All the Ca$_2$P$_2$O$_7$ and Al$_2$O$_3$ were precipitated onto the core alumina, corresponding to 0.398 wt%, Ca$_2$P$_2$O$_7$ and 18.76 wt% Al$_2$O$_3$ based on the product. The Ca$_2$P$_2$O$_7$/Al$_2$O$_3$ ratio was 0.0212.

Dry solids recovered as in EXAMPLE 1 amounted to 234.0 g, corresponding to a yield of 94.6%.

The surface area of the product was 43.0 m$^2$/g.

EXAMPLE 5

This example describes the preparation of a powder comprising crystalline alumina coated silicon carbide having a composite coating of calcium pyrophosphate and hydrous alumina.

The solutions used were the same as those described in EXAMPLE 3.

1000 g of 500 grit SiC powder (Norton Company Grade 100 G.I.) having a surface area of 0.56 m$^2$/g was added to 2500 ml of water with good agitation in a 4-liter beaker. The stirred aqueous suspension was heated to 75° C. and the pH was adjusted to 8.5. An aqueous solution of sodium aluminate (Vinings VSA #38) was added to the SiC suspension and the pH was maintained at 8.5 by the concurrent addition of 20% HCl After adding 100 ml of the NaAl(OH)$_4$ solution over a period of two hours, the suspension was stirred at pH 8.5 and a temperature of 75° C. for an additional 30 minutes. All the Al$_2$O$_3$ was precipitated onto the SiC, corresponding to 3.71 wt% Al$_2$O$_3$ based on the composition. The solids were recovered by filtering the suspension and washed with deionized water until free from sodium and chloride ions. The alumina coated SiC was dried overnight in an air oven at 120° C. and calcined at 1000° C. for one hour to convert the coating to anhydrous crystalline alumina.

The calcined product was added to 2500 ml of water with good agitation in a 4-liter beaker. The stirred aqueous suspension was heated to 75° C. and the pH was adjusted to 8.5 with a few drops of 6N NaOH. 445 ml of a 0.224 M solution of Na$_4$P$_2$O$_7$.10H$_2$O and 148 ml of a 1.35 M solution of CaCl$_2$ were added concurrently over a two hour period and the pH was maintained at 8.5 by addition of 20% HCl. The suspension was cured by stirring at pH 8.5 and a temperature of 75° C. for an additional 30 minutes. Aqueous sodium aluminate (Vinings VSA #38) was added dropwise and the pH was maintained at 8.5 by the controlled addition of 20% HCl. After adding 130 ml of sodium aluminate solution over a period of two hours the suspension was cured by stirring at pH 8.5 and 75° C. for an additional 30 minutes. All the Ca$_2$P$_2$O$_7$ and Al$_2$O$_3$ were precipitated onto the alumina coated silicon carbide particles corresponding to 1.59 wt% Ca$_2$P$_2$O$_7$ and 4.69 wt% Al$_2$O$_3$ based on the product. The Ca$_2$P$_2$O$_7$/Al$_2$O$_3$ ratio was 0.339.

The solids were recovered by filtering the suspension and washed with deionized water until free from sodium and chloride ions. The solids were dried overnight in an air oven at 120° C.

The surface area was 25.2 m$^2$/g.

The product was calcined at 1000° C. for two hours wherein the alumina portion of the coating formed an anhydrous crystalline alumina coating.

What is claimed:

1. A composition comprising an alumina coated refractory ceramic particulate substrate of average particle size in the range of from 0.1 to 2500 microns having a first coating of a calcium component and a second coating of an alumina component, wherein said first and second coating comprises about 0.5 to 25 wt% of the total composition and the ratio of first coating to second coating is about 0.01 to 0.95.

2. The composition of claim 1 wherein the refractory substrate is alpha alumina.

3. The composition of claim 1 wherein the refractory substrate is selected from the group consisting of oxides, carbides, borides, nitrides of aluminum, titanium, zirconium, silicon and mixtures thereof wherein said refractory substrate surface is covered with a crystalline form of alumina.

4. The composition of claim 1 wherein the first coating is selected from the group consisting of calcium pyrophosphate, calcium phosphate, calcium silicate, calcium aluminate and mixtures thereof.

5. The composition of claim 1 wherein the second coating is hydrous alumina.

6. The composition of claim 5 wherein the hydrous alumina is predominately boehmite alumina.

7. A composition comprising an alpha alumina platelet having an average size in the range of from 0.1 to 2500 microns and a total composition surface area in the range of from about 17.3 to about 57.2 $m^2/g$, said alpha alumina platelet having deposited thereon a first coating of calcium pyrophosphate and a second coating of boehmite alumina; wherein said first and second coating comprises 0.5 to 25 wt% of the total composition.

8. A composition comprising an alumina coated refractory particulate substrate of average particle size of 0.1 to 2500 microns having a first coating of a calcium component and a second coating of an alumina component wherein said first and second coatings comprise 0.5 to 25 wt% of the total composition and combine to provide a debonding function between a preform and a ceramic matrix.

9. A calcined composition comprising an alpha alumina substrate of average particle size of 0.1 to 2500 microns having a first coating of calcium pyrophosphate and a second coating of a densified, anhydrous, crystalline alumina coating wherein said first and second coatings comprise 0.5 to 25 wt% of the total composition.

* * * * *